(12) United States Patent
Wise

(10) Patent No.: US 12,552,646 B2
(45) Date of Patent: Feb. 17, 2026

(54) WILDERNESS LIFTING SYSTEM

(71) Applicant: Shane Alden Wise, Everson, WA (US)

(72) Inventor: Shane Alden Wise, Everson, WA (US)

( * ) Notice: Subject to any disclaimer, the term of this patent is extended or adjusted under 35 U.S.C. 154(b) by 151 days.

(21) Appl. No.: 18/428,421

(22) Filed: Jan. 31, 2024

(65) Prior Publication Data

US 2024/0359955 A1 Oct. 31, 2024

Related U.S. Application Data

(60) Provisional application No. 63/498,120, filed on Apr. 25, 2023.

(51) Int. Cl.
*B66D 3/04* (2006.01)

(52) U.S. Cl.
CPC .................................. *B66D 3/04* (2013.01)

(58) Field of Classification Search
CPC ................ B66D 3/04–08; F16H 55/36–566
See application file for complete search history.

(56) References Cited

U.S. PATENT DOCUMENTS

| | | | | |
|---|---|---|---|---|
| 3,757,959 A * | 9/1973 | Thompson | ............... | B66D 3/04 254/398 |
| 4,372,435 A * | 2/1983 | Bradbury | ............... | B65G 13/10 198/782 |
| 4,492,363 A * | 1/1985 | Niskin | ..................... | B66D 1/36 254/394 |
| 4,747,810 A * | 5/1988 | Shepley | ..................... | F16H 7/02 474/903 |
| 7,329,197 B2 * | 2/2008 | Gearhart | ................. | F16H 55/36 474/112 |
| 7,562,862 B1 * | 7/2009 | Jackson | .................... | B66D 3/14 254/391 |
| 2014/0070154 A1 * | 3/2014 | Win | ........................ | B66D 3/04 254/416 |
| 2018/0029831 A1 * | 2/2018 | Renvall | .................. | F16H 55/52 |

* cited by examiner

*Primary Examiner* — Anna M Momper
*Assistant Examiner* — Nathaniel L Adams
(74) *Attorney, Agent, or Firm* — RANKIN, HILL & CLARK LLP

(57) ABSTRACT

A wilderness lifting system includes a first wall that defines a first ball socket and a second wall that is spaced from the first wall. The second wall defines a second ball socket. The wilderness lifting system also includes a neck portion that connects the first wall and the second wall together, and a ball rotatably received in the first ball socket and the second ball socket.

18 Claims, 5 Drawing Sheets

US 12,552,646 B2

WILDERNESS LIFTING SYSTEM

BACKGROUND

With outdoor sporting activities, for example, hunting, wild game recovery, backpacking, shelter making, whitewater raft recovery, and other outdoor activities, weight, packability, and performance of equipment is of particular importance. Further, it is frequently required that an individual be able to move a heavy object (i.e., load). However, there is no known apparatus utilizing an ultralight system to assist with moving the heavy objects. Accordingly, improvements are needed.

SUMMARY

In view of the foregoing, a wilderness lifting system includes a first wall that defines a first ball socket and a second wall that is spaced from the first wall. The second wall defines a second ball socket. The wilderness lifting system also includes a neck portion that connects the first wall and the second wall together, and a ball rotatably received in the first ball socket and the second ball socket.

DETAILED DESCRIPTION

It should, of course, be understood that the description and drawings herein are merely illustrative and that various modifications and changes can be made in the structures disclosed without departing from the present disclosure. The terminology used herein is for the purpose of describing particular embodiments only and is not intended to be limiting of the invention. As used herein, the term "and/or" includes any and all combinations of one or more of the associated listed items. As used herein, the singular forms "a," "an" and "the" are intended to include the plural forms as well as the singular forms, unless the context clearly indicates otherwise.

Figure 1:
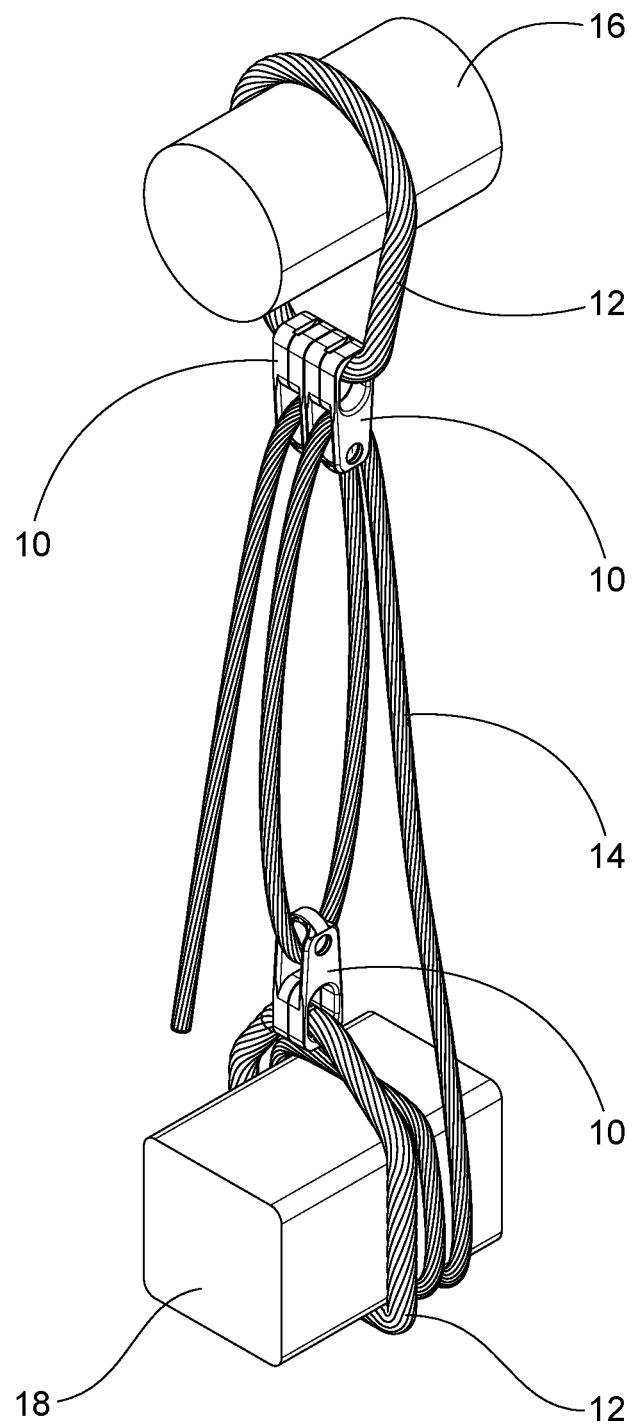
FIG. 1 is a perspective view of a plurality of wilderness lifting systems in use.

FIG. 1 shows a wilderness lifting system 10. Notably, FIG. 1 shows a plurality of wilderness lifting systems 10 that are connected to an associated first rope 12 and an associated second rope 14. The associated first rope 12 (aka anchor rope) can be directly connected to an anchor 16 and the associated second rope 14 can be connected to a load 18 that is desired to be moved.

The anchor 16 and the load 18 are schematically illustrated in FIG. 1. However, it will be appreciated that in actual application in the wilderness, that the anchor 16 could be a tree, a portion of a tree, such as a stump or tree limb, or other large, fixed object. The load 18 could be wild game that has been recently harvested, food bags that must be hung to prevent access by bears, tarps, tents, shelter guylines, hammocks, or stuck vessels. As will also be appreciated, the anchor 16 and the load 18 could be other elements without departing from the scope of this disclosure.

The associated first rope 12 and the associated second rope 14 could be made of the same or different materials from one another. Further, the associated first rope 12 and the associated second rope 14 could be a variety of components, for example, cord, string, cable etc. without departing from the scope of the disclosure and may be used as a standalone element to configure leverage or with a plurality of ropes to achieve a more sophisticated leverage system.

It is envisioned that the associated first rope 12 and the associated second rope 14 could be parachute cord (aka paracord or 550 cord), which is a lightweight nylon kernmantle rope originally used in the suspension lines of parachutes. However, other types and sizes of rope can be used without departing from the scope of this disclosure.

For clarity, only one of the wilderness lifting systems 10 will be discussed, but it will be understood that a plurality of wilderness lifting systems 10 could be utilized together (FIG. 1). Unless otherwise noted, it will be appreciated that the following description of the wilderness lifting system 10 is applicable to all of the wilderness lifting systems 10 individually.

Figure 2:
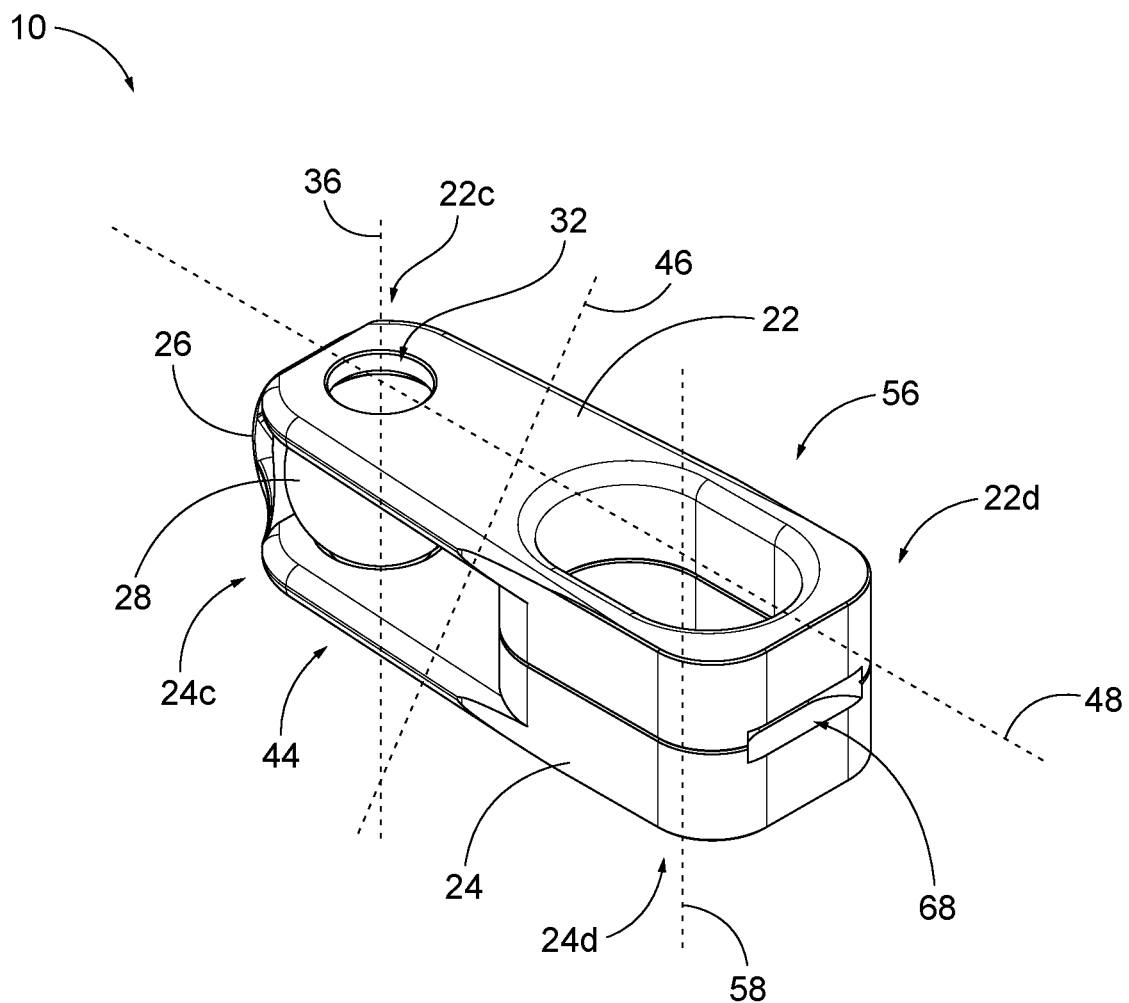
FIG. 2 is a perspective view of one of the wilderness lifting systems of FIG. 1 in a finished state.

Furthermore, unless otherwise noted, it will be appreciated that all references to the wilderness lifting system 10 are of the wilderness lifting system 10 in a finished state, as illustrated in FIGS. 1-2. However, to aid in explanation, the wilderness lifting system 10 is also shown in unfinished and partially finished states (FIGS. 3-5) and is not indicative of the state of the wilderness lifting system 10 in operation.

With reference to FIGS. 2-5, the wilderness lifting system 10 can include a first wall 22, a second wall 24, a neck portion 26, and a ball 28. The first wall 22, the second wall 24, and the neck portion 26 can be made of a variety of materials that provide sufficient strength and rigidity to the wilderness lifting system 10. For example, the first wall 22, the second wall 24, and the neck portion 26 could be made of high carbon heat treated stainless steel alloys. However, other materials are possible and contemplated.

Further, the first wall 22, the second wall 24, and the neck portion 26 can be constructed by way of subtractive manufacturing practices from a monolithic stainless alloy. Alternatively, the first wall 22, the second wall 24, and the neck portion 26 could be separate components that are attached to one another by known means. The first wall 22, the second wall 24, and the neck portion 26 may be constructed from, in part or whole, metals, alloys, composites or other natural or synthetic materials by way of additive or subtractive techniques or any combination thereof.

The neck portion 26 can define a centerline of the wilderness lifting system 10 about which the first wall 22 and the second wall 24 are bent or formed so as to capture the ball 28 when the wilderness lifting system 10 is in the finished state (i.e., FIGS. 1-2). As will be appreciated, this bending or forming occurs in a manner so as to allow the associated second rope 14 to pass over and around the ball 28 without binding while also providing sufficient support to allow the ball 28 to be under a load via the associated second rope 14 while maintaining the ball 28 in confinement.

Figure 3:
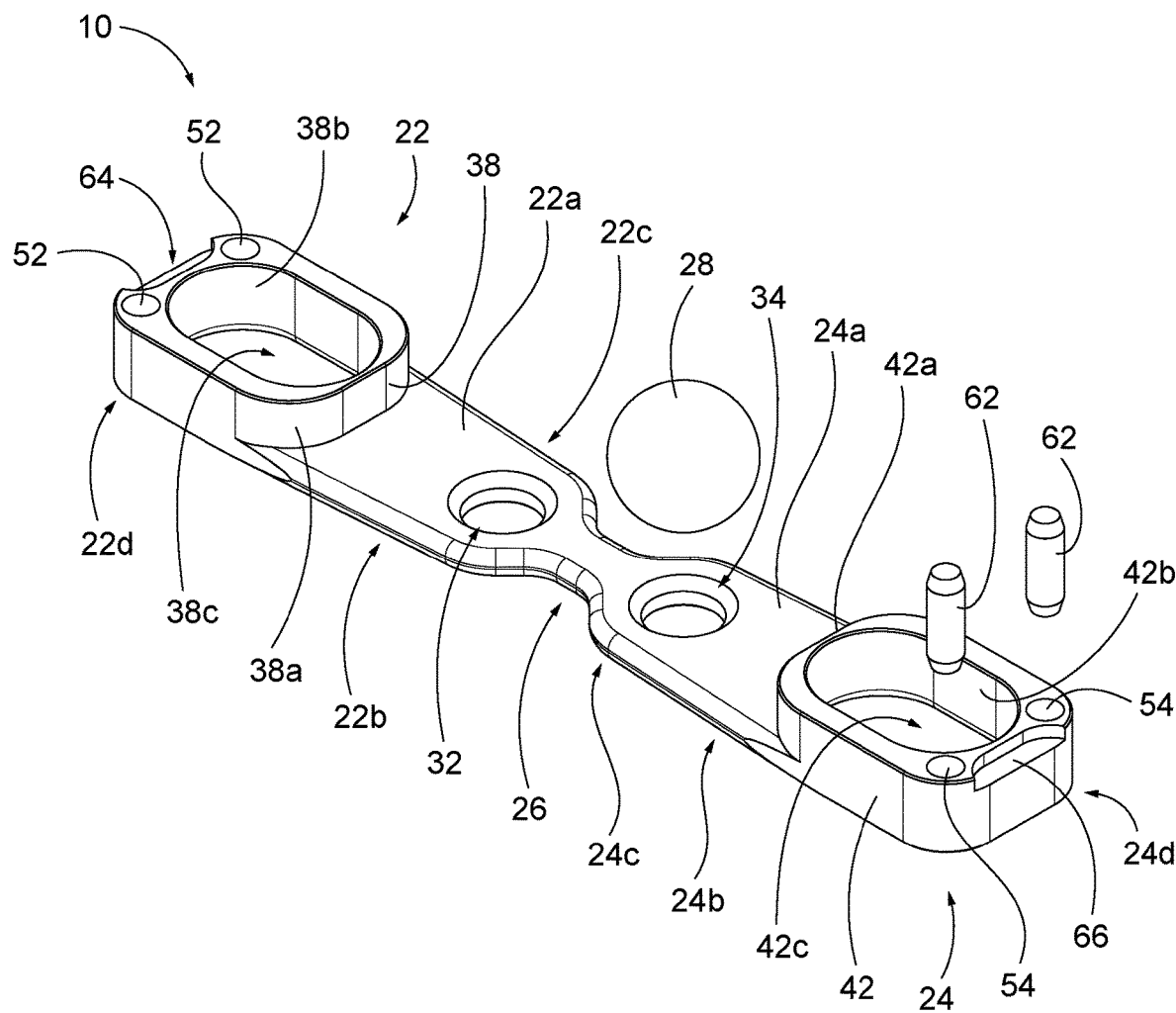
FIG. 3 is a top perspective exploded view of the wilderness lifting system of FIG. 2 in an unfinished state.
Figure 4:
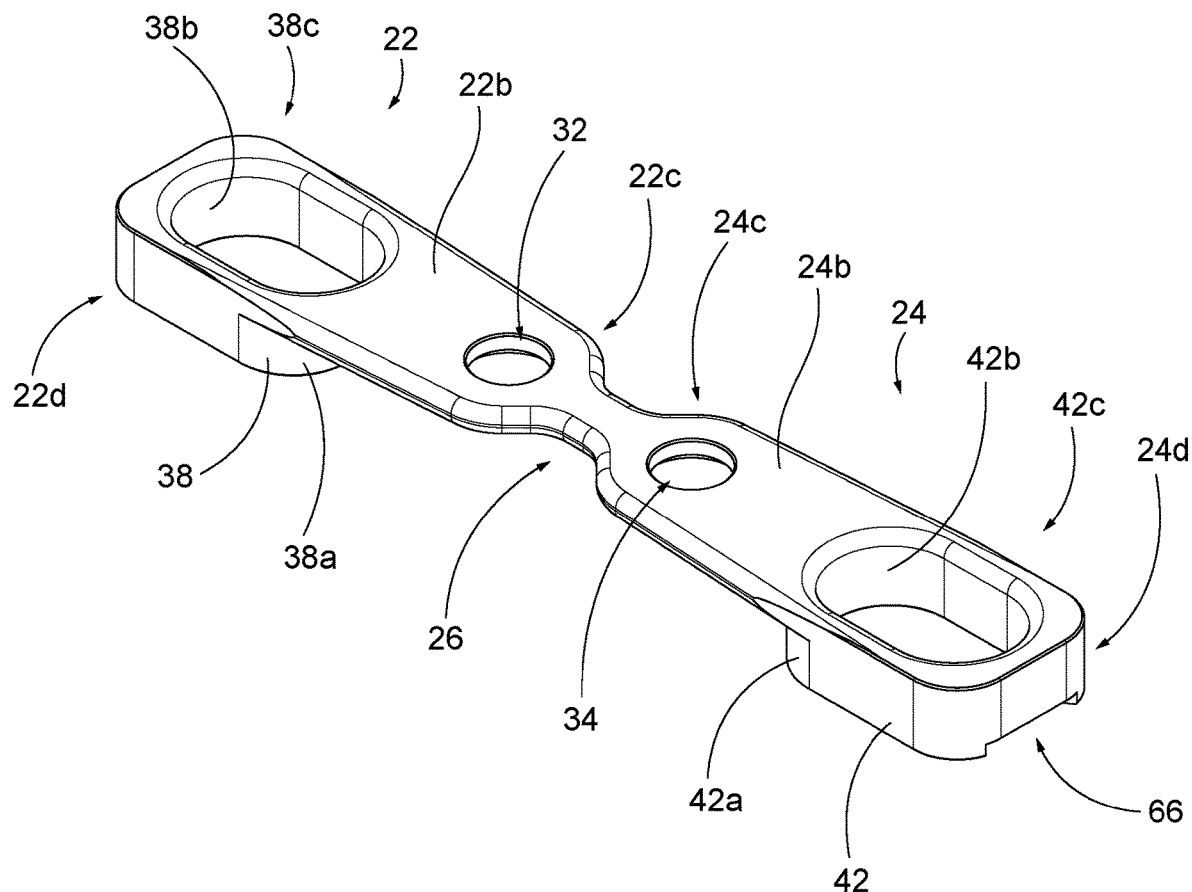
FIG. 4 is a bottom perspective view of a portion of the wilderness lifting system of FIG. 3 in the unfinished state.
Figure 5:
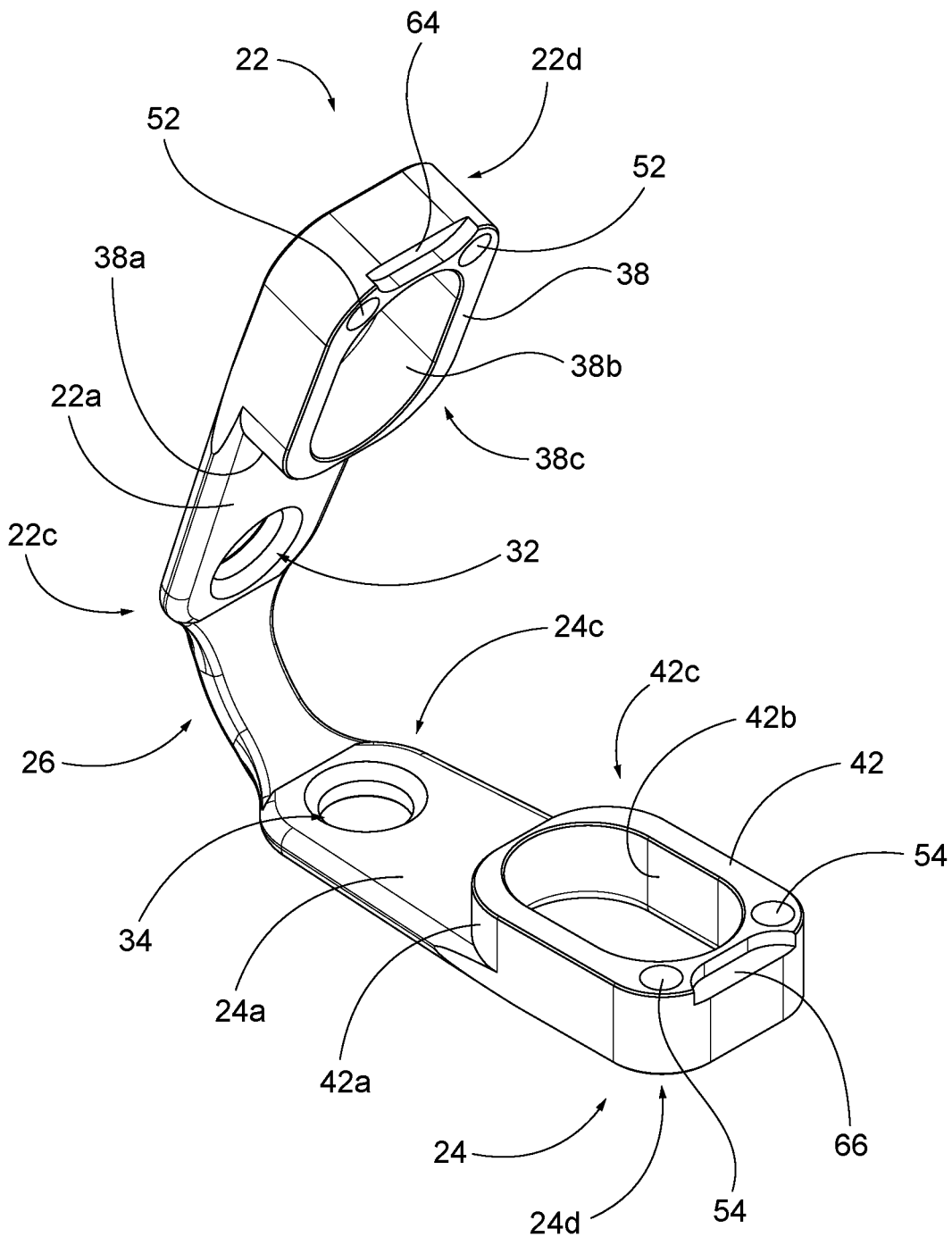
FIG. 5 is a top perspective view of the wilderness lifting system of FIG. 2 in a partially finished state.

With attention to FIGS. 3-5, the first wall 22 can define a first ball socket 32 and the second wall 24 can define a second ball socket 34. The first ball socket 32 can define a first ball socket diameter and the second ball socket 34 can define a second ball socket diameter. Further, the first ball socket 32 and the second ball socket 34 can cooperate to define a ball axis 36 (FIG. 2). Additionally, the second wall 24 can be spaced from the first wall 22. As such, the ball 28 can be rotatably received in the first ball socket 32 and the second ball socket 34.

The ball 28 can be rotatably received in the first ball socket 32 and the second ball socket 34 and can be spherical in shape. Further, the ball 28 can define a ball diameter and the ball diameter can be greater than the first ball socket diameter. The ball 28 can function as both an axle and as a sheave of the wilderness lifting system 10. The ball 28 may freely rotate within the confinement of the first wall 22 and the second wall 24 allowing the associated second rope 14 to pass over the ball 28.

The ball 28 can be constructed from a variety of materials, including for example, a high carbon stainless alloy. However, the ball 28 could be made from, in part or whole, other metals, alloys, ceramics or glass without departing from the scope of this disclosure. It is also envisioned that the ball 28 may be coated with a variety of components to alter the friction capabilities of the ball 28.

Because of the location of the first ball socket 32 and the second ball socket 34 with relation to the neck portion 26, the ball 28 is provided sufficient clearance to allow the ball 28 to freely rotate about all three axes as an axle against the first ball socket 32 and the second ball socket 34. Further, the clearance between the ball 28 and the first ball socket 32 and the second ball socket 34 allows the ball 28 to freely rotate as a sheave in relation to the associated second rope 14 that passes over the ball 28. Additionally, the first ball socket 32 and the second ball socket 34 can each include a chamfered edge to further facilitate easy rotation of the ball 28.

The first wall 22 can include a first wall interior surface 22a and a first wall exterior surface 22b. The first wall interior surface 22a and the first wall exterior surface 22b can face in opposite directions from one another. The second wall 24 can include a second wall interior surface 24a and a second wall exterior surface 24b.

The second wall interior surface 24a and the second wall exterior surface 24b can face in opposite directions from one another. The first wall interior surface 22a, the first wall exterior surface 22b, the second wall interior surface 24a, and the second wall exterior surface 24b can define a first wall interior plane, a first wall exterior plane, a second wall interior plane, and a second wall exterior plane, respectively.

The first wall interior plane, the first wall exterior plane, the second wall interior plane, and the second wall exterior plane can be parallel to one another. This parallel arrangement provides numerous advantages. For example, a plurality of the wilderness lifting systems 10 can be stacked together while each is tethered together to the anchor 16 and/or the load 18, as is shown in FIG. 1. This arrangement provides for a compact and strong assembly. For example, it is envisioned that a single wilderness lifting system 10 will weigh less than one quarter of an ounce.

The first wall interior surface 22a can face the second wall interior surface 24a and the ball 28 can be disposed therebetween. The first wall interior surface 22a and the second wall interior surface 24a can be spaced from one another to define a wall gap and the ball diameter can be greater than the wall gap. Further still, a distance along the ball axis 36 between the first wall exterior surface 22b and the second wall exterior surface 24b can be greater than the diameter of the ball 28.

The wilderness lifting system 10 can also include a first pillar 38 extending from the first wall interior surface 22a and a second pillar 42 extending from the second wall interior surface 24a. The first pillar 38 and the second pillar 42 can be of the same or different composition as the first wall 22 and the second wall 24, respectively. As illustrated, the first pillar 38 and the second pillar 42 are integral to the first wall 22 and the second wall 24, respectively. However, it will be appreciated that the first pillar 38 and the second pillar 42 could be separate from the first wall 22 and the second wall 24, respectively, without departing from the scope of this disclosure.

Further, the first pillar 38 can include a first pillar outer perimeter surface 38a and a first pillar inner perimeter surface 38b. The second pillar 42 can include a second pillar outer perimeter surface 42a and a second pillar inner perimeter surface 42b. With continued attention to FIGS. 3-5, the first pillar 38 and the second pillar 42 can each extend an equal amount from the first wall 22 and the second wall 24, respectively, to a distance that is less than the radius of the ball 28.

Such a layout provides for a compact assembly, which can be easily carried into the wilderness. However, it will be appreciated that the first pillar 38 and the second pillar 42 could extend unequal distances from the first wall 22 and the second wall 24, respectively, without departing from the scope of this disclosure.

The first wall 22, the second wall 24, the first pillar 38, the second pillar 42, and the ball 28 can cooperate to define a passage 44 for receipt of the associated second rope 14 (FIGS. 1-2) to pass through the wilderness lifting system 10. More particularly, the first wall interior surface 22a, the second wall interior surface 24a, the first pillar outer perimeter surface 38a, the second pillar outer perimeter surface 42a, and the ball 28 can cooperate to define the passage 44.

Additionally, the passage 44 can define a lateral axis 46 that is orthogonal to a longitudinal axis 48 (FIG. 2). The first wall 22 can define a first wall width along the lateral axis 46 and a first wall length along the longitudinal axis 48. The first wall length can be at least two times greater than the first wall width.

The first pillar 38 can define a plurality of first pin holes 52 and the second pillar 42 can define a plurality of second pin holes 54. As illustrated, the first pin holes 52 and the second pin holes 54 are cylindrical in shape. However, other shapes are possible and contemplated. The plurality of first pin holes 52 and the plurality of second pin holes 54 can be in registry.

The plurality of first pin holes 52 can each define a first pin hole diameter and the plurality of second pin holes 54 can each define a second pin hole diameter. The first pin hole diameter and the second pin hole diameter can be the same value, thereby simplifying manufacturing of the wilderness lifting system 10. It is noted that the plurality of first pin holes 52 and the plurality of second pin holes 54 can be blind bores. Because of this arrangement, a smooth exterior surface is provided to the user of the wilderness lifting system 10. As will be appreciated, this results in improved comfort for the user during operation and storage.

The first pillar 38 can define a first pillar aperture 38c extending from the first wall interior surface 22a and the second pillar 42 can define a second pillar aperture 42c extending from the second wall interior surface 24a. The first pillar aperture 38c and the second pillar aperture 42c can be in registry. Further, the first pillar aperture 38c and the second pillar aperture 42c can cooperate to define an eyelet 56 (FIG. 2) that receives the associated first rope 12 (FIG. 1).

More particularly, the first pillar inner perimeter surface 38b and the second pillar inner perimeter surface 42b can cooperate to define the eyelet 56. As such, the first pillar aperture 38c and the second pillar aperture 42c can cooperate to define an eyelet axis 58 (FIG. 2) and the ball axis 36 and the eyelet axis 58 can be parallel to one another. Further, the longitudinal axis 48 can be orthogonal to the ball axis 36 and the eyelet axis 58. Such a layout results in a compact wilderness lifting system 10 that maximizes the mechanical advantage provided.

The wilderness lifting system 10 can also include a plurality of pins 62 (FIG. 3). As illustrated, the plurality of pins 62 can be cylindrical in shape. However, other shapes are possible and contemplated. Further, the plurality of pins 62 can assist in providing retention of the first wall 22 and the second wall 24 together to sufficiently confine the ball 28, so that the ball 28 is retained by the first ball socket 32 and the second ball socket 34 when the first wall 22 and the second wall 24 are formed about the neck portion 26.

The plurality of pins 62 may be constructed from a variety of materials, such as high carbon heat treated stainless steel alloys. However, other materials are possible and contemplated. Alternatively, the plurality of pins 62 could be replaced by alternative connection methods such as welding, bolting, riveting, or any combination thereof. The plurality of pins 62 can also provide improved tensile strength to the wilderness lifting system 10. Notably, the plurality of pins 62 can assist in preventing an unintended separation of the first wall 22 and the second wall 24 from one another, thereby resulting in an increased wall gap which could result in loss of retention of the ball 28.

The plurality of pins 62 can each define a pin diameter. The plurality of pins 62 can be made of a same or different material than the first wall 22. Further, the plurality of first pin holes 52 and the second pin holes 54 can be sized so as to slidingly receive the plurality of pins 62. Additionally, the first pin hole diameters can be less than the pin diameters to forcibly retain the plurality of pins 62 in the first pin holes 52 and second pin hole diameters can be less than the pin diameters to forcibly retain the plurality of pins 62 in the second pin holes 54. As such, assembly of the wilderness lifting system 10 is simplified and manufacturing costs are reduced.

The first wall 22 can also include a first neck end 22c that is adjacent the neck portion 26 and a first pillar end 22d. The first neck end 22c and the first pillar end 22d can be disposed at opposite terminal ends of the first wall 22. As such, the first wall 22 can define the longitudinal axis 48 (FIG. 2) that extends through the first neck end 22c and the first pillar end 22d.

The first wall 22 can extend between the first neck end 22c and the first pillar end 22d to define a first wall length. The ball diameter can be less than half of the second wall length. Such a layout provides for a compact wilderness lifting system 10 which can be easily carried in a user's pocket to ensure that the user always has the wilderness lifting system 10 available for use.

The second wall 24 can include a second neck end 24c that is adjacent the neck portion 26 and a second pillar end 24d. The second neck end 24c and the second pillar end 24d can be disposed at opposite terminal ends of the second wall 24. The second wall 24 can extend between the second neck end 24c and the second pillar end 24d to define a second wall length. The first wall length can equal the second wall length. The second neck end 24c and the second pillar end 24d can be disposed at opposite ends of the second wall 24. Additionally, the first pillar end 22d and the second pillar end 24d can define a first groove 64 and a second groove 66, respectively, (FIGS. 3-5) and the first groove 64 and the second groove 66 can cooperate to define a blind slot 68 (FIG. 2).

The blind slot 68 can be used for assembly, disassembly, and maintenance of the wilderness lifting system 10. For example, when the wilderness lifting system 10 is in a finished state (i.e., FIGS. 1-2), a flat tool, such as a screwdriver, can be partially inserted into the blind slot 68 and at least partially rotated. This rotation will result in the first pillar end 22d and the second pillar end 24d at least partially separating from one another, as is shown in FIG. 5.

This separation results in additional space occurring between the first ball socket 32 and the second ball socket 34, thereby allowing for maintenance and/or removal/insertion of the ball 28. As will be appreciated, the wilderness lifting system 10 can only be used with the associated second rope 14 when in a finished state (FIGS. 1-2). However, the wilderness lifting system 10 is shown in unfinished and partially finished states to aid in explanation.

It is noted that the aforementioned wilderness lifting system 10 could be used in a variety of outdoor activities. For example, the wilderness lifting system 10 could be used while hunting to recover an animal or to hang animals after they are harvested for butchering or processing, while hiking to hang bear bags or to set tarp, tent or other shelter guy-lines, or to hang a hammock. Further still, the wilderness lifting system 10 could be used while whitewater rafting to recover a stuck vessel with a "Z drag."

The aforementioned wilderness lifting system 10 provides a number of advantages. For example, the wilderness lifting system 10 allows for reduced volume, which in turn results in reduced weight, all while providing increased strength, which are all extremely beneficial advantages when having to carry the wilderness lifting system 10 in the outdoors. With regard to size, it will be appreciated that several of the wilderness lifting systems 10 could be held in a palm of a user's hand. Furthermore, the limited number of components of the wilderness lifting system 10 also allows for increased reliability as there are fewer components, and hence, fewer possible points of failure.

As will also be appreciated, the wilderness lifting system 10 provides numerous advantages as it relates to the movement of heavy loads. When a single wilderness lifting system 10 is used, a user is able to change a direction of travel of the load 18, as compared to if only the rope is used without the wilderness lifting system 10. Further, when multiple wilderness lifting systems 10 are used at once, a mechanical advantage is provided.

Notably, when multiple wilderness lifting systems 10 are stacked next to one another, each ball 28 independently rotates from every other ball 28. Thus, one wilderness lifting system 10 is attached to the anchor 16 (i.e., fixed mounting point) and the other is attached to the moving load 18. The mechanical advantage of using multiple wilderness lifting systems 10 is equal to the number of sections of the associated second rope 14 that support the moving load 18 about the wilderness lifting system 10. The wilderness lifting system 10 can be characterized by the use of a single continuous rope to transmit a tension force around one or more wilderness lifting system 10 to lift or move the load 18.

A wilderness lifting system 10 has been described above in particularity. Modifications and alterations will occur to those upon reading and understanding the preceding detail description. The disclosure, however, is not limited to only the embodiment described above. Instead, the invention is broadly defined by the appended claims and the equivalents thereof.

The invention claimed is:

1. A wilderness lifting system, comprising:
a first wall defining a first ball socket, wherein the first wall includes a first wall interior surface and a first wall exterior surface, the first wall interior surface and the first wall exterior surface facing in opposite directions from one another;
a second wall spaced from the first wall, the second wall defining a second ball socket, wherein the second wall includes a second wall interior surface and a second wall exterior surface, the second wall interior surface and the second wall exterior surface facing in opposite directions from one another;
a neck portion that connects the first wall and the second wall together;
a ball rotatably received in the first ball socket and the second ball socket, wherein the first wall interior surface faces the second wall interior surface and the ball is disposed therebetween;
a first pillar extending from the first wall interior surface and defining a first pillar aperture; and
a second pillar extending from the second wall interior surface and defining a second pillar aperture, wherein the first pillar aperture and the second pillar aperture cooperate to define an eyelet.

2. The wilderness lifting system of claim 1, wherein the first ball socket and the second ball socket cooperate to define a ball axis and a distance along the ball axis between the first wall exterior surface and the second wall exterior surface is greater than a diameter of the ball.

3. The wilderness lifting system of claim 1, wherein the first pillar aperture and the second pillar aperture are in registry for receipt of an associated first rope.

4. The wilderness lifting system of claim 1, further comprising a plurality of pins, wherein the first pillar defines a plurality of first pin holes and the second pillar defines a plurality of second pin holes, and wherein the plurality of first pin holes are in registry with the plurality of second pin holes to slidingly receive the plurality of pins.

5. The wilderness lifting system of claim 4, wherein the plurality of pins each define a pin diameter and the plurality of first pin holes each define a first pin hole diameter, and wherein each of the first pin hole diameters are less than each of the pin diameters to forcibly retain the plurality of pins in the first pin holes.

6. The wilderness lifting system of claim 4, wherein the plurality of first pin holes and the plurality of second pin holes are blind bores.

7. The wilderness lifting system of claim 1, wherein the first wall interior surface and the second wall interior surface are spaced from one another to define a wall gap, and wherein the ball defines a ball diameter that is greater than the wall gap.

8. The wilderness lifting system of claim 1, wherein the first ball socket defines a first ball socket diameter and the second ball socket defines a second ball socket diameter, and wherein the ball defines a ball diameter, the ball diameter being greater than the first ball socket diameter.

9. The wilderness lifting system of claim 1, wherein the first ball socket and the second ball socket cooperate to define a ball axis and the first pillar aperture and the second pillar aperture cooperate to define an eyelet axis, and wherein the ball axis and the eyelet axis are parallel to one another.

10. The wilderness lifting system of claim 9, wherein the first wall includes a first neck end that is adjacent the neck portion and a first pillar end, the first neck end and the first pillar end being disposed at opposite ends of the first wall, wherein the second wall includes a second neck end that is adjacent the neck portion and a second pillar end, the second neck end and the second pillar end being disposed at opposite ends of the second wall.

11. The wilderness lifting system of claim 10, wherein the first wall extends between the first neck end and the first pillar end to define a first wall length and the second wall extends between the second neck end and the second pillar end to define a second wall length, wherein the first wall length equals the second wall length, and wherein the ball defines a ball diameter that is less than half of the first wall length.

12. The wilderness lifting system of claim 10, the first wall defining a longitudinal axis that extends through the first neck end and the first pillar end, wherein the longitudinal axis is orthogonal to the ball axis and the eyelet axis.

13. The wilderness lifting system of claim 12, wherein the first wall, the second wall, the first pillar, the second pillar, and the ball cooperate to define a passage for receipt of an associated second rope to pass through the wilderness lifting system, and wherein the passage defines a lateral axis that is orthogonal to the longitudinal axis.

14. The wilderness lifting system of claim 13, the first wall defining a first wall width along the lateral axis and a first wall length along the longitudinal axis, wherein the first wall length is at least two times greater than the first wall width.

15. The wilderness lifting system of claim 1, the first pillar including a first pillar outer perimeter surface and a first pillar inner perimeter surface and the second pillar including a second pillar outer perimeter surface and a second pillar inner perimeter surface, wherein the first pillar inner perimeter surface and the second pillar inner perimeter surface cooperate to define the eyelet.

16. The wilderness lifting system of claim 15, wherein the first wall interior surface, the second wall interior surface, the first pillar outer perimeter surface, the second pillar outer perimeter surface, and the ball cooperate to define a passage for receipt of an associated second rope to pass through the wilderness lifting system.

17. The wilderness lifting system of claim 1, wherein the first wall interior surface, the first wall exterior surface, the second wall interior surface, and the second wall exterior surface define a first wall interior plane, a first wall exterior plane, a second wall interior plane, and a second wall exterior plane, respectively, and wherein the first wall interior plane, the first wall exterior plane, the second wall interior plane, and the second wall exterior plane are parallel to one another.

18. The wilderness lifting system of claim 1, wherein the first wall includes a first neck end that is adjacent the neck portion and a first pillar end, the first neck end and the first pillar end being disposed at opposite ends of the first wall, wherein the second wall includes a second neck end that is adjacent the neck portion and a second pillar end, the second neck end and the second pillar end being disposed at opposite ends of the second wall, wherein the first pillar end and the second pillar end define a first groove and a second groove, respectively, and wherein the first groove and the second groove cooperate to define a blind slot.

* * * * *